Sept. 2, 1930.   J. R. DUNBECK   1,774,791
TRUCK
Filed Nov. 9, 1925   2 Sheets-Sheet 1

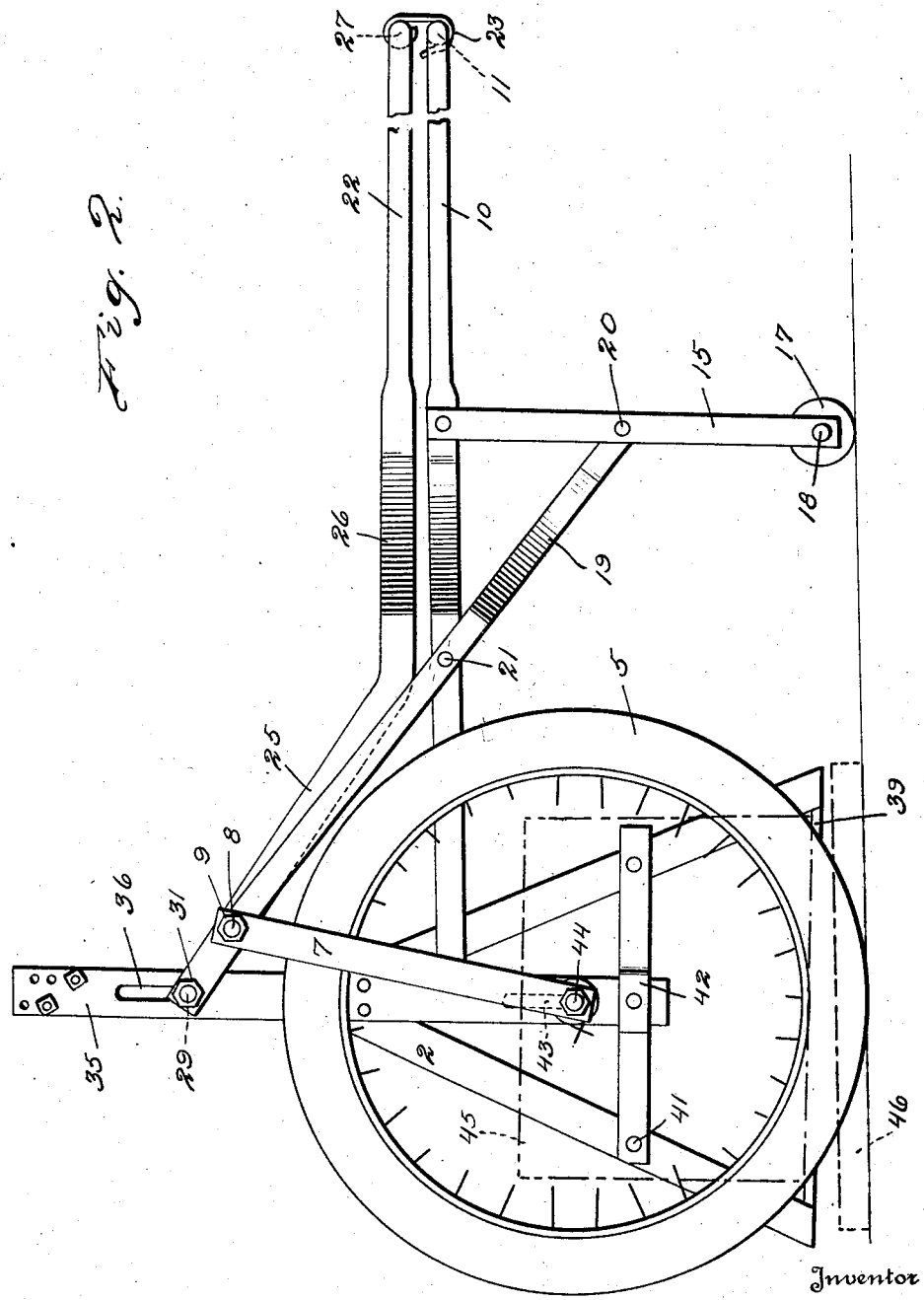

Patented Sept. 2, 1930

1,774,791

UNITED STATES PATENT OFFICE

JOSEPH R. DUNBECK, OF ROCHESTER, NEW YORK, ASSIGNOR TO THE SYMINGTON COMPANY, OF NEW YORK, N. Y., A CORPORATION OF MARYLAND

TRUCK

Application filed November 9, 1925. Serial No. 68,017.

This invention relates to buggies or trucks for raising, lowering and carrying relatively heavy articles and more particularly moulds used in connection with foundry practice.

The principal object of my invention, generally considered, is the construction of a truck or buggy suitable for raising and carrying moulds and other heavy articles used in foundry practice without undue exertion on the part of the operator.

A feature of my invention resides in providing a truck or the like with a wheeled frame having an operating handle, said frame being formed with a transversely extending fulcrum rod and a raising and lowering lever pivoted on said rod and supporting at one end a load carrying frame or rack.

Another feature of my invention consists in constructing a truck or buggy with a wheeled truck portion provided with an operating handle for moving said truck portion about and in associating therewith frame members extending from axles of said wheels and supporting a transverse fulcrum rod, said fulcrum rod serving for supporting a lifting frame pivoted thereto, the short end of said lifting frame supporting a transverse rod to which are resiliently connected lifting and load carrying brackets of said buggy.

Other objects and advantages of the invention relating to the particular arrangement and construction of the various parts will become apparent as the description proceeds.

Referring to the drawings illustrating my invention, the scope whereof is defined by the appended claims:

Figure 2 is a side elevation of the embodiment shown in Figure 1 but illustrating the operating lever lowered and the load raised.

Figure 1:
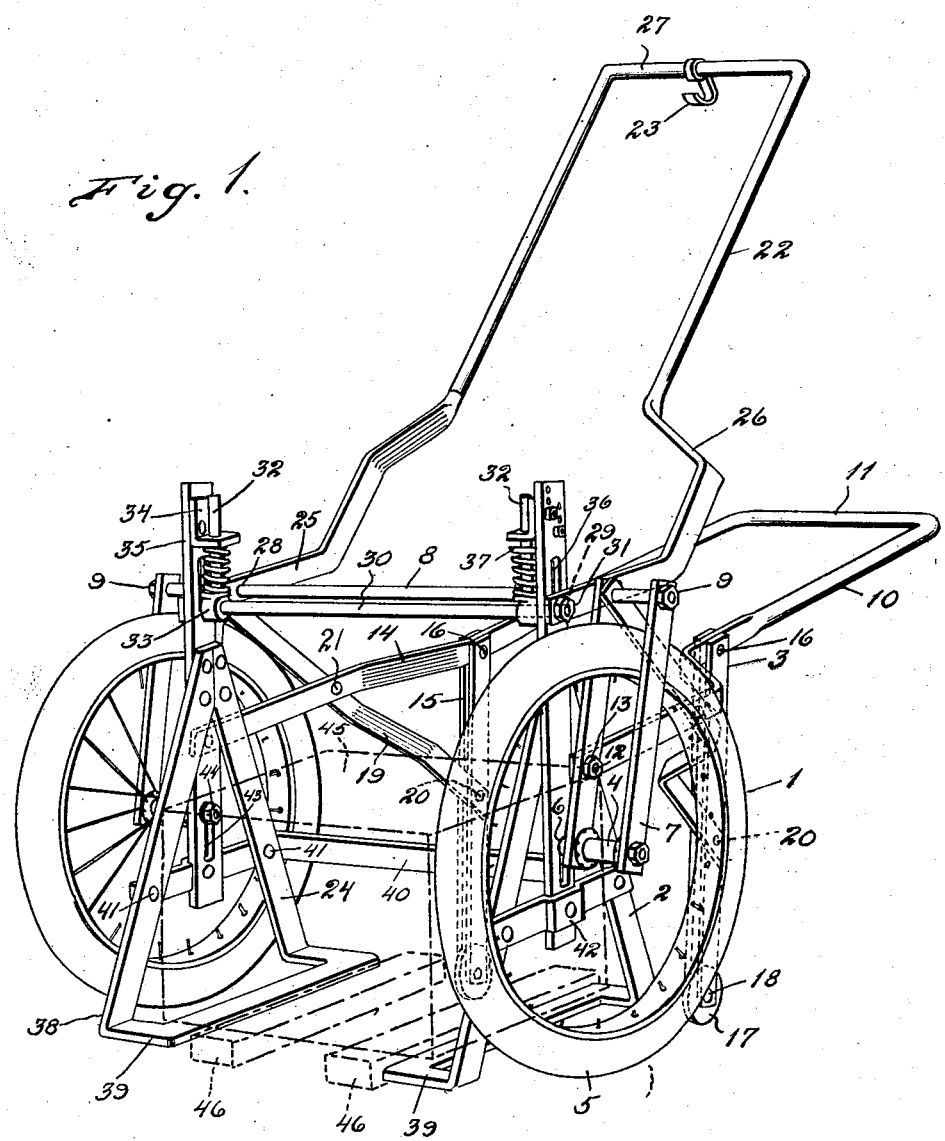
Figure 1 is a perspective view of a preferred embodiment of my lifting and carrying truck or buggy, portions of the wheel spokes thereof being broken away to better show the construction and a load about to be lifted and carried away, illustrated diagrammatically.

Referring to the drawings in detail, like parts being designated by like reference characters, I have shown one form of my buggy which is devised particularly for lifting, carrying and lowering moulds and other heavy articles in connection with foundry practice, although it is obvious that the same may be used for transporting other articles if desired. My buggy comprises essentially a truck portion 1 and a lifting and carrying device 2 movably connected with respect to said truck portion.

Truck portion 1 is preferably formed as a main metal frame 3 carrying stub axles 4 upon which are mounted wheels 5. Said frame may be conveniently made partly of piping connected together by the usual piping fittings and partly of iron or steel strips or rods if desired. The wheels 5 on said truck portion 1 may be conveniently formed as motor cycle wheels mounted on axles 4 corresponding with the usual motor cycle axles except that said axles are provided with extensions 6 projecting towards each other for a purpose to be more fully explained hereinafter.

Extending from said axles 4 in a generally upward direction are wheel frame members 7, said members 7 supporting adjacent their upper ends a transverse preferably cylindrical rod 8 serving to rigidly connect the wheel frames 7 and the connected side portions of the truck frame 3. Said rod 8 may be connected with respect to the wheel frames in any desired manner with the outer frame portions 7 connected to the ends of said rod by nuts 9, as illustrated. Preferably connected to intermediate portions of the inner wheel frame members 7 is a U-shaped member 10, the intermediate or closed portion 11 of which is preferably formed circular in cross section and adapted for serving as a handle for manually moving the buggy from place to place. The ends of said U-shaped member 10 are preferably connected to the frame member 7 in any desired manner as by means of rivets or bolts and nuts 12 and 13 respectively, as illustrated. The intermediate or closed end of the U-shaped member 10 is preferably narrower than the ends of said member which are connected to the wheel frames so that said wheel frames may be spaced relatively far apart and the handle portion 11 of the member may be of a size for convenient operation of the device. The relatively narrow closed end of the U-shaped member 10 may be connected with the more widely spaced end portions thereof by diagonal or flaring portions 14 and preferably depending from said member 10 adjacent the junctions between the diagonal portions 14 and the handle portions 11 of the member are depending strut or stop portions 15. Each of said strut portions 15 is preferably formed as a plurality of strips or straps, as illustrated, connected at their upper ends with the U-shaped member 10 on opposite faces thereof by bolts or rivets 16 and provided with small wheels or rollers 17 journalled between the lower ends of the parts of the members 15 preferably by bolts or pins 18, as illustrated. For bracing the depending struts 15 with respect to the rest of the truck frame 3 as well as bracing the U-shaped member 10 with respect to said truck frame, diagonal bracing members 19 are preferably provided, as illustrated, extending diagonally downward from the transverse rod 8 to the strut portions 15 and each brace connected between adjacent strut elements by bolts or rivets 20. The intermediate portions of the bracing members 19 are connected to the corresponding registering portions of the U-shaped member 10 by means of bolts or rivets 21. As will be apparent from a consideration of the drawing, portions of said diagonal bracing members 19 are bent and extended inwardly to correspond with the diagonal portions 14 of the U-shaped member 10 so that the various parts may be properly connected together.

The lifting and carrying device 2 is provided with an operating handle or lever 22 which is preferably U-shaped and conforms in outline with the U-shaped member 10 of the truck frame so that when in lowered position, as illustrated in Figure 2, it may be conveniently connected with the handle portion 11 by means of a pivoted hook or latch member 23. When in such a position or substantially horizontal it supports the carrying frame or rack 24 in elevated position and overlies the U-shaped member 10 to a substantial extent. The free ends 25 of said U-shaped member 22, however, beyond the diagonal or flaring portions 26 thereof are normally bent with respect to the closed or handle portion 27 of said member 22 and extend diagonally upward, as illustrated particularly in Figure 2. A relatively short distance from the free ends of said U-shaped operating member 22 the portions 25 thereof are perforated at 28 and pivoted on the transverse member or pivot rod 8 of the truck portion 1. The free ends of said operating frame or lever 22 are likewise perforated at 29 and provided with a transverse rod 30 connecting said ends and connected to said ends in any desired manner as by means of external nuts 31, as illustrated. Supported by means of said rod 30 are bolts 32 provided with perforated heads 33 through the perforations of which extend said rod 30. The free ends of said bolts 32 are slidably mounted in angular bracket or lug members 34 mounted on the upper portions of the supporting frame or carrying device 2 and more particularly upon the upright standards 35 thereof in any desired manner as by means of bolts, rivets or other connecting means. Said standards 35 are slotted at 36 and the transverse rod 30 is received in said slots and adapted for sliding motion therein.

Mounted upon said bolts 32 between the heads 33 thereof and the bracket or lug portions 34 are coil or helical springs 37 which are normally in compression between said heads 33 and brackets 34 thereby tending to maintain the rod 30 in the lower ends of the slots 36 and tending to raise the opposite or manually operated end of the operating lever 22. Such a construction also serves for resiliently supporting the load carrying device 2 and more particularly the standard 35 thereof from which depend the angular load carrying bracket portions 38 suitably connected to the standards 35 at their upper ends as illustrated and formed at their lower ends with substantially horizontal load supporting shelf portions 39. For bracing the load carrying portions 38 to each other and to the standards 35, for forming the load carrying rack 24, a substantially U-shaped connecting bail member 40 is fastened between all of said members 35 and 38 as by means of rivets or bolts 41. In order to provide for connecting said member 40 flat against the members 35 and 38, said member is formed with offset portions 42 embracing the lower ends of the standards 35 as illustrated.

For properly guiding the standards 35 and frame members connected thereto, said standards are preferably slotted as indicated at 43 and the extensions 6 from the axles 4 are slidably received in said slots 43 thereby maintaining the load carrying portions in the desired angular relation with respect to the truck portion 1 of the buggy. Nuts 44 are then preferably applied on the ends of the extensions 6 to maintain the standards 35 in the desired slidable relation therewith.

From the foregoing description of the construction of my buggy it will be apparent that the same may be utilized as follows for raising and carrying heavy articles and particularly moulds, or flasks therefor, used in foundry practice. In the drawings I have shown diagrammatically by dot and dash lines a heavy article 45 resting on planks or other similar supports 46 so that the lateral edges of said body project beyond said planks. The buggy is so designed that when the lifting and supporting frame is lowered as shown in Figure 1, the supporting shelf portions 39 are nearly touching the floor or ground so that said buggy may be moved to the load 45 with the shelf portions 39 extending between the lower face of said load 45 and the ground or floor, a requisite space being provided for having said load raised off the ground by the supporting planks 46. When this has been accomplished, the operating lever 22 is lowered from the position shown in Figure 1 to that shown in Figure 2 and the hook or latch 23 is engaged with the handle 11 thereby raising the supporting shelf portions 39 and the load 45 and maintaining the same in elevated position above the floor or ground as illustrated in Figure 2. The operator may then push the buggy and its supporting load, as shown in Figure 2, to the desired location either with or without raising struts 15 and their wheels 17 off the floor or ground. When said location has been reached, the load may be set down upon planks similar to the planks 46 before mentioned by moving the operating handle 22 to the position shown in Figure 1 and the buggy then removed from engagement with the load 45.

From the foregoing description of the construction and operation of my device, it will be apparent that by means of such a buggy which is especially adapted for moving moulds around a foundry, such moulds or other loads may be readily lifted or transported from place to place by a single man with great ease because of the leverage afforded in lifting the moulds and because of the relatively large rubber-tired wheels provided on said buggy.

Having now described my invention, what I claim is:

1. A truck comprising a main frame, a plurality of rotatably mounted wheels, frame members respectively connecting the wheels to the main frame, a transverse member rigidly connecting said frame members and an operating member mounted on said transverse member as a fulcrum, said operating member supporting a carrying rack at one end and adapted for manual operation at the other end.

2. A wheeled truck comprising a main frame, a plurality of frame members having wheels rotatably mounted thereon, a member extending transversely of the main frame for connecting the frame members to each other and to the main frame, and an operating member mounted on said transveresly extending member as a fulcrum, said operating member supporting carrying means at one end and adapted for being manually operated at the other end.

3. A wheeled truck comprising a main frame, a plurality of frame members having wheels rotatably mounted thereon, a member extending transversely substantially the full width of the truck and connecting said frame members to each other and to the main frame, and an operating frame pivoted at an intermediate portion on said transversely extending member as a fulcrum, said operating frame carrying load supporting means at one end and provided with manual operating means at the other.

4. A truck comprising a wheeled frame with an operating handle thereon, means for retaining said operating handle at a convenient elevation above the ground, a plurality of frame members having wheels rotatably mounted thereon, a transversely extending member connecting said frame members above the axis of rotation of said wheels, and a carrying frame pivoted on said transverse member and provided with a handle for raising and lowering a rack portion adapted for carrying articles.

5. A truck comprising a four wheeled frame serving as a carriage portion, a transverse fulcrum rod on said carriage portion, and a lifting and carrying device involving a member pivoted on said fulcrum rod and formed adjacent one of its ends with manual operating means, and load carrying means pivotally suspended from said member adjacent its opposite end and adapted to be moved upwardly and downwardly relatively to the carriage portion of the truck when the said member is actuated.

6. A truck comprising a wheeled frame serving as a carriage means for a lifting and carrying device, said device being provided with lifting brackets formed with supporting uprights resiliently connected to the short arm of an operating lever pivotedly connected to said wheeled frame, said upright portions being slotted and engaging a transverse member of said operating lever whereby relative motion therebetween is permitted.

7. A truck comprising a frame, axles mounted on either side of said frame and provided with portions extending towards each other, wheels mounted on said axles, a transverse connecting member on said frame, an operating lever pivoted on said transverse member and provided with a handle at one end and with a depending load carrying frame at the other end, said load carrying frame being provided with uprights formed with slots with which the axle extensions cooperate for guiding said frame.

8. A buggy for carrying heavy articles comprising a truck portion and a lifting and carrying frame portion movably connected therewith, said truck portion being formed with an operating handle, roller stops depending from said handle for holding the same in a convenient position, said truck portion being provided with a plurality of axles, wheels respectively mounted on each of said axles, a frame extending from the axle of each wheel and connected to said operating handle and a transversely extending member connecting said wheel frames above the wheels and serving to support the lifting and carrying frame.

9. A buggy for lifting and carrying heavy articles comprising a truck portion formed with a transverse fulcrum rod and with wheels and axles, said axles being formed with inward projections, a lifting and carrying device pivoted with respect to said fulcrum rod and slidably mounted on said axle extensions, said lifting and carrying device being formed with a rod extending through slots in frame portions thereof, said rod being spring mounted on brackets extending from said frame portions and an operating handle for said lifting and carrying device pivoted to the fulcrum rod of the truck with its short arm connected to the rod of the lifting device and with its long arm formed with a manual operating handle.

10. A buggy for lifting and carrying articles comprising a wheeled truck formed with a handle for moving the same about and stops for supporting the handle in a convenient elevated position, a lifting and carrying frame movably mounted with respect to said truck and provided with a handle for raising and lowering said frame, and means operatively interposed between the said frame handle and frame for resiliently supporting the latter.

11. In a buggy, the combination with a wheeled truck portion, of a member pivotally connected to said truck position, relatively movable load lifting and carrying means connected to said member adjacent one of its ends and means operatively interposed between the member and the load lifting and carrying means for resiliently supporting the latter.

In testimony whereof I affix my signature.

JOSEPH R. DUNBECK.